(12) United States Patent
Yamaki et al.

(10) Patent No.: US 6,337,039 B1
(45) Date of Patent: *Jan. 8, 2002

(54) METHOD FOR MAKING OPTICAL DISK BY INJECTION MOLDING

(75) Inventors: Hiroshi Yamaki; Yoshimasa Matsuura, both of Kawasaki; Hiroshi Kataoka, Tokyo, all of (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/560,916

(22) Filed: Apr. 28, 2000

Related U.S. Application Data

(62) Division of application No. 08/922,482, filed on Sep. 3, 1997.

(30) Foreign Application Priority Data

Sep. 3, 1996 (JP) .............................................. 8-232818

(51) Int. Cl.$^7$ .......................... B29D 11/00; B29C 45/57; C08J 3/18
(52) U.S. Cl. .......................... 264/1.33; 264/69; 264/71; 264/85; 264/500; 264/328.1
(58) Field of Search ................................ 264/1.33, 106, 264/107, 330, 328.1, 328.2, 328.14, 328.16, 331–4, 500, 83, 85, 69, 71

(56) References Cited

U.S. PATENT DOCUMENTS 4,164,523 A 8/1979 Hanning et al.
4,627,809 A * 12/1986 Okbayashi et al. ......... 264/106

FOREIGN PATENT DOCUMENTS

| DE | 4314869 A | 5/1993 |
| EP | A2-0276763 | 8/1988 |
| EP | A3-0276763 | 8/1988 |
| JP | 61-213111 A | 9/1986 |
| JP | 62-231715 A | 10/1987 |
| JP | 05-318541 | 12/1993 |
| WO | 9425242 A1 | 11/1994 |

OTHER PUBLICATIONS

Chiou J S et al: "Plasticization of Glassy Polymers by $CO_2$" Journal of Applied Polymer Science, 1985, pp. 2633–2642.

Gosei Jushi, 42(1) 48(1996), "Approach to High Quality Level Injection Molding From Heat Transfer Viewpoint" "Precision Injection Molding Process Assisted by Infrared Radiation" (Partial Translation).

* cited by examiner

Primary Examiner—Mathieu D. Vargot
(74) Attorney, Agent, or Firm—Birch, Stewart, Kolasch & Birch, LLP

(57) ABSTRACT

A method for molding a thermoplastic resin by filling a molten thermoplastic resin into a mold which comprises carrying out the molding of the resin while reducing the solidification temperature of the resin surface which contacts with the mold during the step of filling the resin. According to this molding method, the state of the mold surface can be faithfully transferred to molded articles.

6 Claims, 13 Drawing Sheets

SOLUBILITY OF CARBON DIOXIDE IN POLYSTYRENE

SOLUBILITY OF NITROGEN GAS IN POLYSTYRENE

SOLUBILITY OF CARBON DIOXIDE IN POLYSTYRENE

SOLUBILITY OF CARBON DIOXIDE
IN POLYSTYRENE

REDUCTION OF Tg DUE TO DISSOLUTION OF
CARBON DIOXIDE IN POLYSTYRENE

SOLUBILITY OF CARBON DIOXIDE IN PMMA/PVF2 POLYMER ALLOY

REDUCTION OF Tg DUE TO DISSOLUTION OF CARBON DIOXIDE IN PMMA/PVF2 POLYMER ALLOY

REDUCTION OF Tg OF THE SYNTHETIC RESINS DUE TO DISSOLUTION OF CARBON DIOXIDE IN EACH RESIN

METHOD FOR MAKING OPTICAL DISK BY INJECTION MOLDING

This application is a divisional of co-pending application Ser. No. 08/922,482, filed on Sep. 3, 1997, the entire contents of which are hereby incorporated by reference.

BACKGROUND OF THE INVENTION

1. Field of the Invention

The present invention relates to a method for molding a thermoplastic resin according to which the surface state of a mold can be faithfully transferred to the surface of molded articles.

2. Description of the Related Art

In the molding of a thermoplastic resin, the temperature of the mold is usually kept sufficiently lower than the temperature at which the molding resin is solidified. This is necessary for cooling, in a short time, a resin material that is very low in thermal conductivity and is in the molten state to a temperature at which the resin can be removed as a molded article. Furthermore, in order to faithfully transfer the surface state of the mold to the resulting molded articles, it is necessary to press a resin in the state of low viscosity to the mold under a high pressure. However, if the mold temperature is lower than the solidification temperature of the resin, filling of the resin and solidification of the resin proceed simultaneously, and the resin contacting the mold at its flow front is rapidly cooled and increases in viscosity. Furthermore, since the resin solidifies in the state of being pressed to the mold surface under a low pressure, it becomes difficult to faithfully transfer the surface state of the mold to the resulting molded articles. Therefore, in the case of usual injection molding, poor appearance of molded articles due to uneven gloss, weld lines, flow marks or jetting may result, or inferior transfer of fine pits in precision molded articles such as optical disks may result. Furthermore, short shot may occur in thin-wall parts.

In order to enhance the transferability of the mold surface, it is necessary to prevent or minimize the solidification of resin during the step of filling the resin.

In the case of injection molding or the like of thermoplastic resins, it has always been demanded to enhance economically the transferability of the mold surface without prolongation of molding cycle time. For enhancing the transferability of a mold surface, various methods have been proposed as exemplified below.

1. A method of repeating heating and cooling of the mold surface by passing alternately a heating medium and a cooling medium through the mold. (Plastic Technology, Vol. 34 (June), 150 (1988) and others).

2. A method of selectively heating the mold surface by radiofrequency induction heating just before molding. (USP 4439492 and others).

3. A method of providing an insulating layer and an electrically conductive layer on the mold surface and passing a current through the electrically conductive layer. (Polym. Eng. Sci., Vol. 34 (11), 894 (1994) and others).

4. A method of radiation heating the mold surface. (Gosei Jushi, Vol. 42 (1), 48 (1996) and others).

5. A method of coating the mold surface with a heat insulating layer and carrying out the molding with heating the mold surface by the heat of the molding resin per se. (USP 5362226, WO97/04938 and others).

In the report of B. H. Kim (Polym. Plast. Technol. Eng., Vol. 25 (1), 73 (1986)), the above methods 1, 2, 3 and 4 which heat the mold surface by external energy such as electricity just before molding are called active control method and the method 5 which heats the mold surface with the heat of the molding resin per se without application of external energy is called passive control method.

Both of the active control method and the passive control method carry out the molding with heating the mold surface at the time of injection molding. That is, when the injected molten resin is pressed to the wall surface of the mold, the mold surface is heated to a temperature higher than the solidification temperature of the resin, whereby transferability of the mold surface is improved.

The present invention is a method of attaining its object by a mechanism which is utterly different from these conventional molding mechanisms to improve the transferability of mold surface. That is, a method for obtaining a remarkable effect by a new idea different from conventional techniques. The present invention has been accomplished on the basis of this finding.

Known prior art somewhat relevant to the present invention will now be explained.

The so-called counter pressure method comprises injection molding of a foamable resin containing a foaming agent or water in a pressurized state by injecting a pressurized gas into a mold cavity prior to filling of the resin, thereby avoiding surface defects such as swirl marks on the molded articles caused by blowing gas. According to this method, a gas pressure is previously applied to a mold cavity in order to prevent occurrence of surface defects due to bursting of foams produced by the blowing gas or vaporized water at the flow front of the molten resin flowing through the mold cavity. The gases used in this case may be those which cause no deterioration of resin due to oxidation. Air is generally used, and any of the inert gases can be used in this molding method. This counter pressure method is employed for injection molding of resins containing foaming agents or resins which have dried insufficiently. When the counter pressure method is employed for molding of generally unfoamable resins, the following problems occur, namely, the gas present in the cavity enters between the molten resin and the mold to hinder the transfer or, in the case of the gas being air, the air is in the state of high oxygen concentration at high temperatures in the part where the air is compressed by the resin in the cavity, whereby deterioration of the resin due to oxidation is brought about. Thus, there is no effect to enhance the transferability of mold surface. Therefore, in order to precisely and faithfully transfer the state of mold surface to the resulting molded articles, the mold is slightly opened only at the time of filling of resin to release the air in the cavity or the pressure in the mold is reduced by a vacuum pump.

JP-A-62-231715 discloses a method of injection molding a water-containing polymer alloy using counter pressure method, and refers to inert gases such as air, nitrogen and carbon dioxide as a gas used for pre-pressurization of mold cavity, but it never suggests the idea of the present invention explained hereinafter.

Furthermore, JP-A-61-213111 discloses a reaction injection molding comprising mixing two monomers and injecting the mixture, wherein the molding is performed after the inner atmosphere of mold cavity is replaced with carbon dioxide of atmospheric pressure thereby to reduce voids produced by the air incorporated into resin at the time of filling the resin. However, the reaction injection molding in which the mold temperature is higher than the temperature of the raw material mixture of two or more monomers utterly differs in the technical field from the injection molding of thermoplastic resins according to the present invention, and thus the prior art does not disclose a method for improving inferior transferability of mold surface which is caused by solidification of resin during a step of filling the resin.

On the other hand, as shown in many literatures such as J. Appln. Polym. Sci., Vol. 30, 2633 (1985), it is known that when carbon dioxide is absorbed into a resin, this acts as a plasticizer for the resin and reduces the glass transition temperature, but this has not been widely applied to the molding of resins. As one of a few examples, DE-A-4314869 discloses a method in which carbon dioxide or a hydrocarbon in supercritical state is dissolved in a bioabsorbable polyester in a high pressure vessel to reduce the glass transition temperature thereof and the resin is molded at a low temperature of about 50° C. However, since this method causes reduction of the glass transition temperature of the whole resin, it is necessary for the molding to use a mold temperature lower than usual temperature by the decrement in the glass transition temperature and thus there is no effect to prevent inferior transfer caused by solidification during the filling of resin.

SUMMARY OF THE INVENTION

The task of the present invention is to economically provide a method for molding thermoplastic resins in which the state of mold surface is faithfully transferred to molded articles by preventing solidification or increase of viscosity of the resin during the filling of the resin.

As a result of investigations conducted by the inventors in an attempt to attain this objective, it has been found that the state of a mold surface can be highly faithfully transferred to the molded articles by a method that is completely different from the conventional method of improving the transferability of the mold surface by heating it. Specifically, the present invention includes the following methods:

1. A method for molding a thermoplastic resin by filling a molten thermoplastic resin into a mold which comprises carrying out the molding of the resin while reducing the solidification temperature of the surface of the resin which contacts with the mold during filling of the resin.

2. A molding method of the above 1, wherein the thermoplastic resin is an amorphous resin and the solidification temperature is the glass transition temperature.

3. A molding method of the above 1 or 2, wherein the thermoplastic resin is filled into a mold cavity which has been filled with a gas having a solubility in the thermoplastic resin at least twice that of air and/or nitrogen at the solidification temperature of the resin.

4. A molding method of the above 3, wherein the gas is carbon dioxide.

5. A molding method of the above 3 or 4, wherein the gas is allowed to be present in the mold cavity under a pressure at which at least 0.1% by weight of the gas is dissolved in the resin at the solidification temperature of the resin, and then the molten resin is filled into the mold cavity to carry out the molding.

6. A molding method of the above 3 or 4, wherein the gas is allowed to be present in the mold cavity under a pressure at which at least 0.5% by weight of the gas is dissolved in the resin at the solidification temperature of the resin, and then the molten resin is filled into the mold cavity to carry out the molding.

7. A molding method of the above 1, 2, 3, 4, 5 or 6, wherein the molding is an injection molding.

PREFERRED EMBODIMENTS OF THE INVENTION

Figure 1:
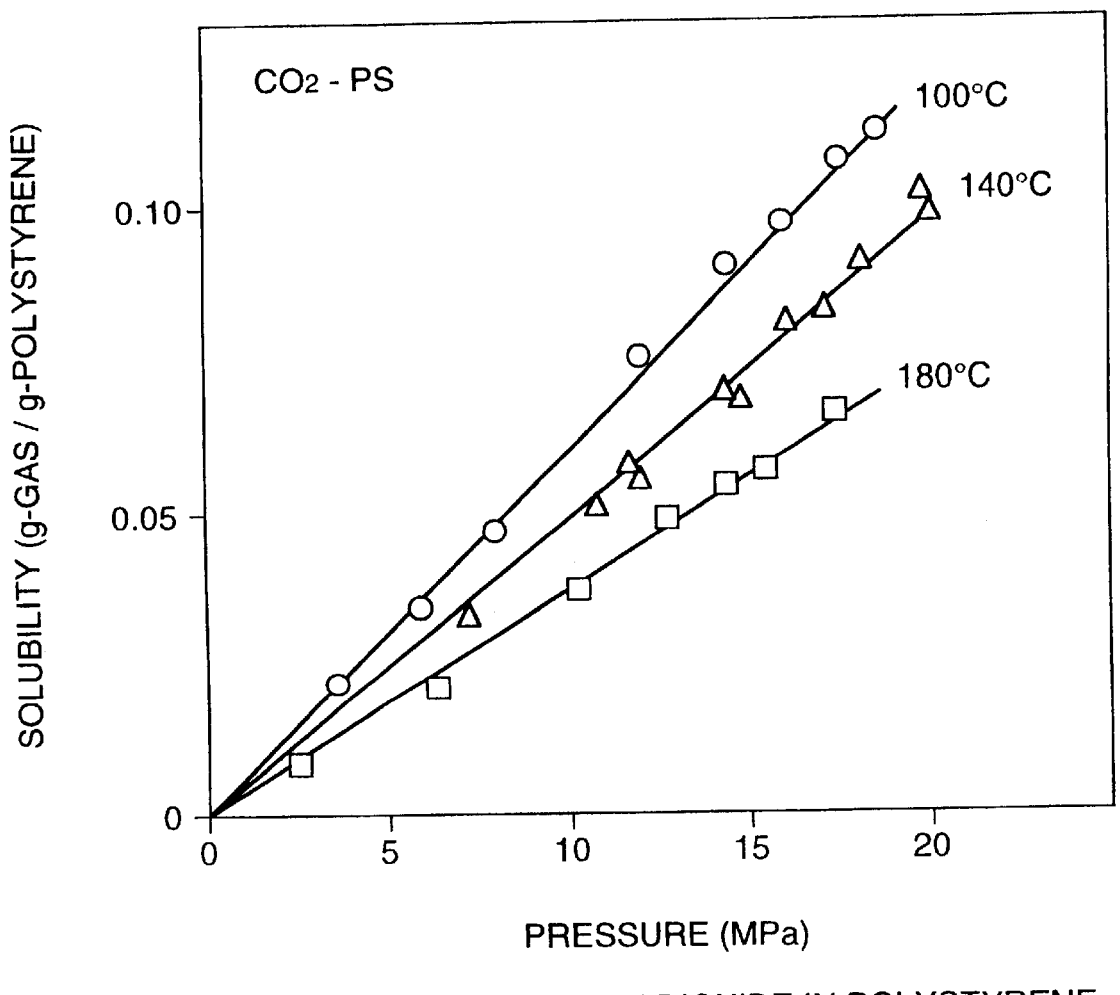
FIG. 1 is a graph which shows solubility of carbon dioxide in polystyrene.

The inventors have noticed the gas in the mold cavity which has been considered to hinder the transfer of the mold surface, and the mechanism of developing the desired effect is considered to be as follows.

In injection molding, the resin always flows as a laminar flow in the mold cavity and forms a solidified layer upon contact with the cooled wall surface of the mold at the interface and the resin which is filled later flows and advances inside the solidified layer, and, after it reaches the flow front, it flows towards the wall surface of the mold in a manner which is called fountain flow. When the resin is filled in the mold cavity after the cavity is filled with a specific gas such as carbon dioxide under an adequate pressure, the gas is absorbed into the flow front of the flowing resin or enters into the interface between the mold and the resin and is dissolved in the surface layer of the resin. The gas dissolved in the resin acts as a plasticizer and selectively reduces the solidification temperature of only the resin surface or reduces the melt viscosity of the resin. If the solidification temperature of only the thin resin surface layer is reduced and reaches a temperature lower than the mold surface temperature, solidification does not occur during the step of filling the resin and as a result the transferability of the mold surface to molded articles can be markedly improved. The gas dissolved in the resin surface layer diffuses into the inside of the resin with lapse of time and the solidification temperature of the resin surface layer increases. Therefore, the surface layer solidifies in the usual resin cooling time and a molded article can be removed.

As a result, the present invention has been accomplished according to which molding is carried out by reducing the solidification temperature of the resin surface which contacts with the mold during the step of filling the resin.

The resin used in the present invention is a thermoplastic resin usable for general injection molding or the like. Preferred are amorphous thermoplastic resins, thermoplastic polymer alloys mainly composed of non-crystalline resins, and some crystalline thermoplastic resins low in crystallinity. Especially preferred are styrene resins such as polystyrene, styrene-acrylonitrile copolymer, rubber-reinforced polystyrene, styrene-methyl methacrylate copolymer, ABS resin and styrene-methyl methacrylate-butadiene copolymer; methacrylic resins such as polymethyl methacrylate and methyl methacrylate-styrene copolymer; polyvinyl acetate; polycarbonate; polyphenylene ether; modified polyphenylene ether containing polystyrene; polysulfone; polyether sulfone; polyether imide; polyarylate; polyamideimide; and vinyl chloride resins such as polyvinyl chloride, vinyl chloride-ethylene copolymer and vinyl chloride-vinyl acetate copolymer. Moreover, blends of these resins, amorphous resins containing a part of the crystalline resins, and resins containing various inoranic or organic fillers are included.

In the present invention, a combination of a gas and a resin in which the gas is well dissolved is preferred. When carbon dioxide is used as the gas, use of resins higher in affinity for carbon dioxide and higher in dissolvability for carbon dioxide can result in a greater effect. Furthermore, in the present invention, a great effect can also be obtained in the case of hardly processable resins which give molded articles of poor appearance.

The solidification temperature of a resin in the present invention is a temperature at which a molten thermoplastic resin solidifies in the mold, and this is the glass transition temperature for the amorphous resins and crystallization starting temperature for the crystalline resins. In the case of incompatible polymer alloys, the solidification temperature is the glass transition temperature or crystallization starting temperature of the resin constituting the sea in the islands structure. Hereupon, the crystallization starting temperature of a crystalline resin means the temperature at which heat generation due to crystallization of the resin is first seen when the resin is heated to a molding temperature to melt it and, then, is cooled at a rate of 20° C./min using a differential calorimeter.

The gas to be filled in the mold cavity is a gas which has a high solubility in the thermoplastic resin, namely, twice or more that of air and/or nitrogen at the solidification temperature of the resin and which has a plasticizing effect for the resin. That is, the gas is present in the mold cavity and is absorbed in the resin surface during the filling of resin to reduce the solidification temperature of the resin surface which contacts with the mold. As is known, a gas having a solubility in the resin similar to that of air or nitrogen only hinders the transfer of mold surface in the cavity and the gas used here is required to have a solubility of at least twice that of air or nitrogen. Furthermore, the gas is selected under conditions that it should not deteriorate the resin, should do no harm to the mold or molding environment and should be inexpensive. A mixture of two or more of the gases can be used if it is high in solubility. Examples of the gas are carbon dioxide, hydrocarbons such as methane, ethane and propane, and flon (fluorocarbons, chlorofluorocarbons, etc.) obtained by replacing a part of hydrogen in the hydrocarbons with fluorine and other substituents. Among them, an optimum one is selected depending on the kind of thermoplastic resin used. Carbon dioxide can be used most suitably from the points of safety, price and ease of handling, and, furthermore, it is highly dissolved in the resin and acts as a plasticizer to result in a great effect to reduce the solidification temperature of the resin.

Solubility of carbon dioxide in resins which is most suitably usable in the present invention and reduction of glass transition temperature (hereinafter referred to as "Tg") of resins caused by dissolution of carbon dioxide will be explained referring to the accompanying drawings.

Figure 2:
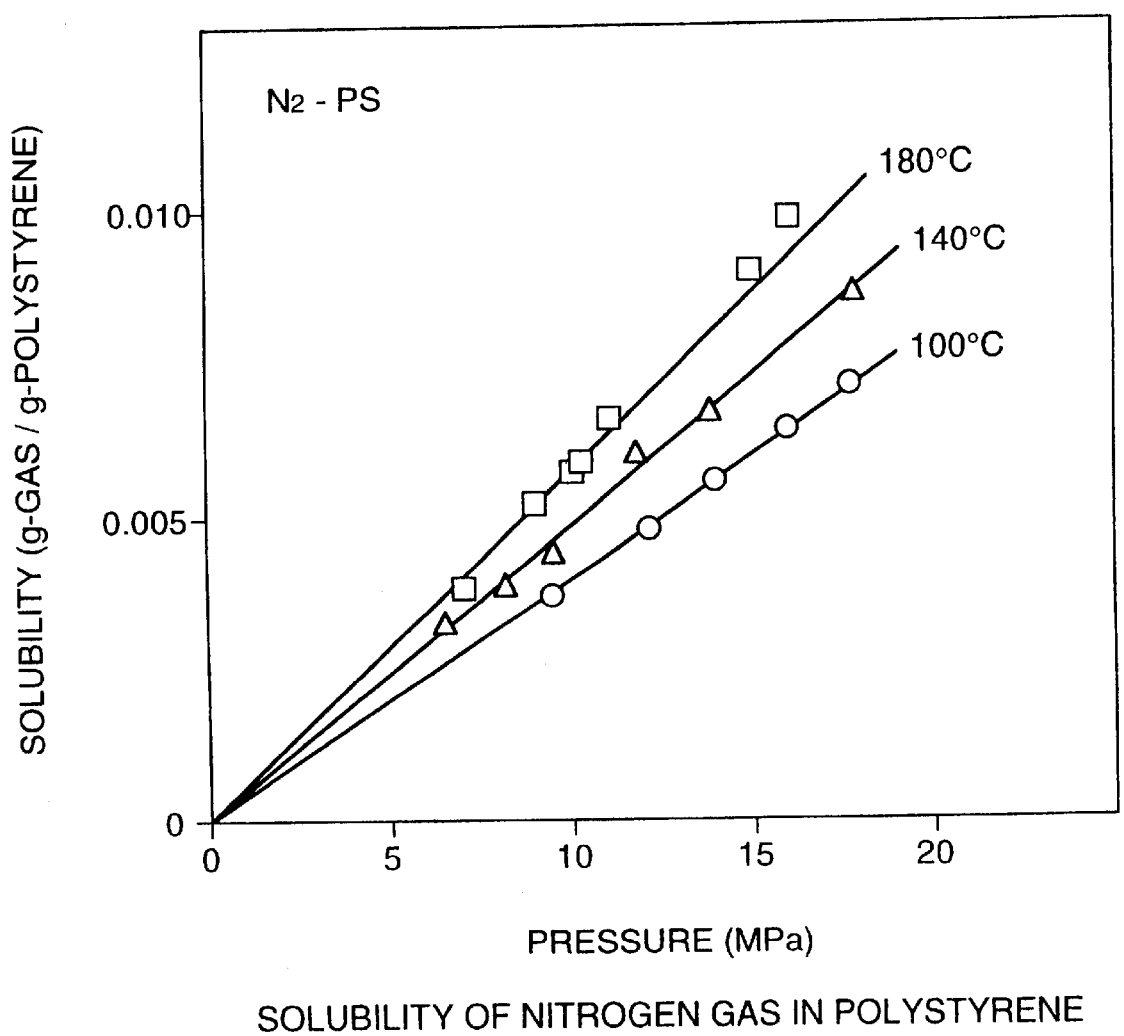
FIG. 2 is a graph which shows solubility of nitrogen in polystyrene.
Figure 5:
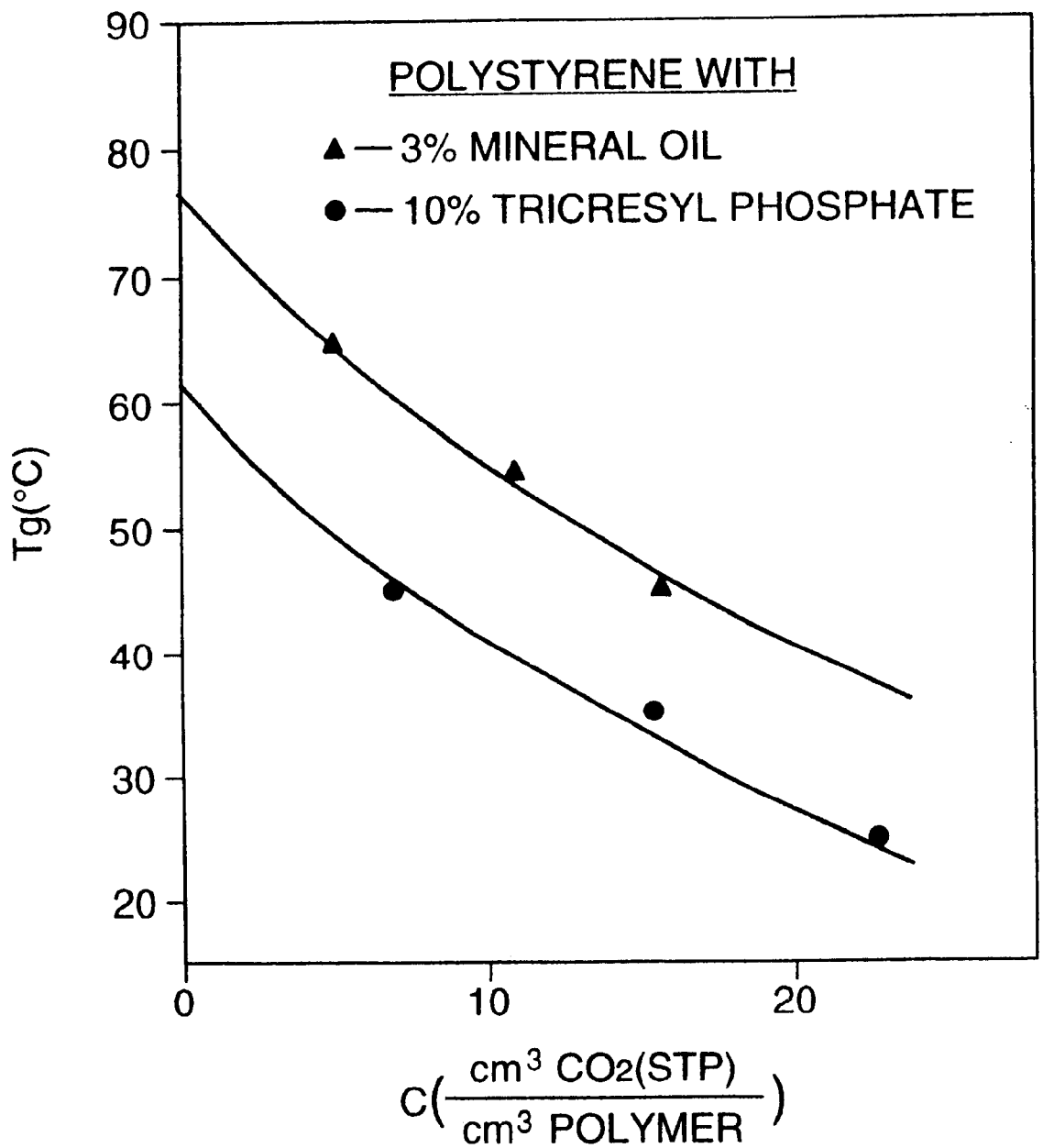
FIG. 5 is a graph which shows reduction of Tg due to dissolution of carbon dioxide in polystyrene.
Figure 6:
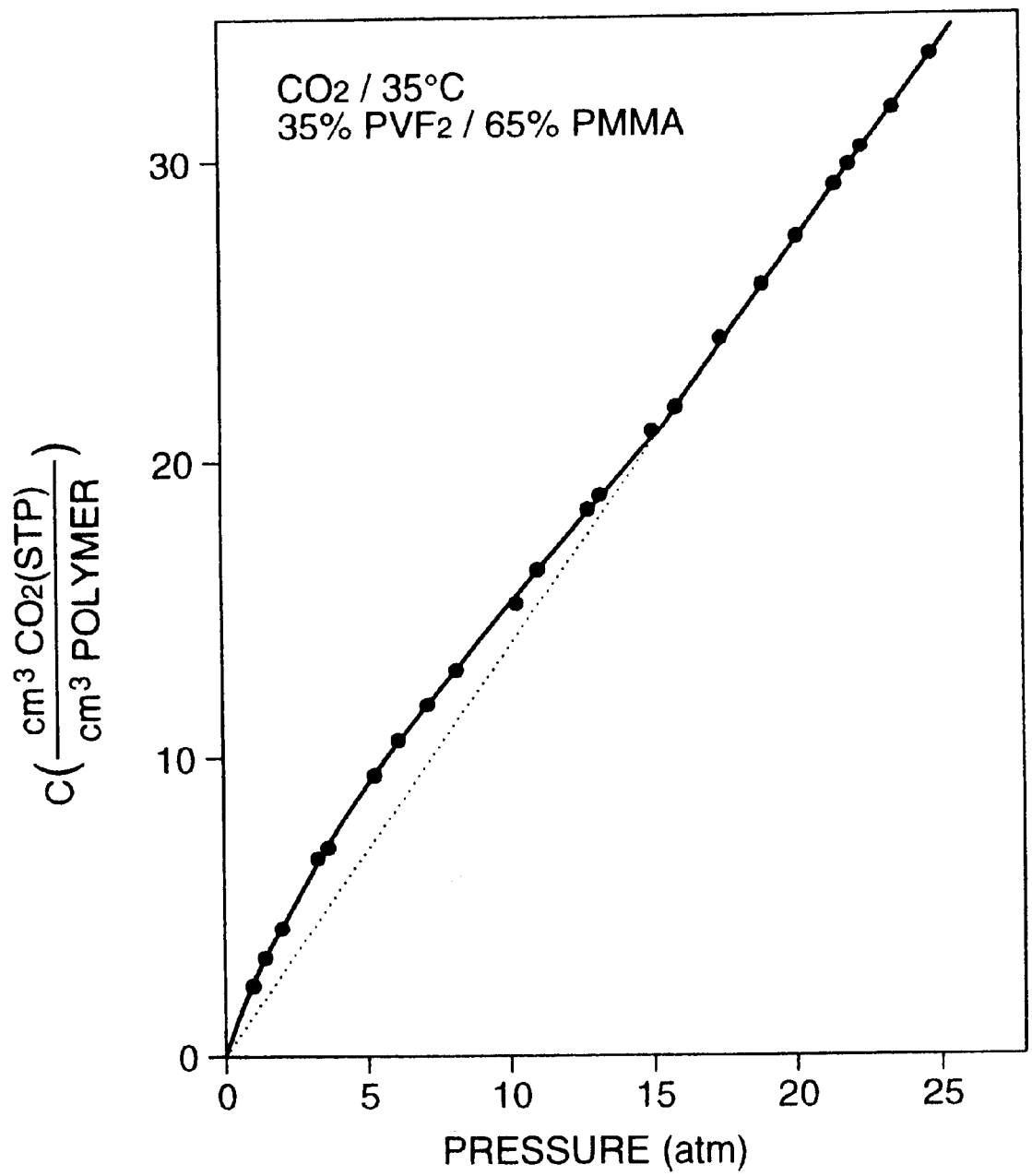
FIG. 6 is a graph which shows solubility of carbon dioxide in PMMA/$PVF_2$ polymer alloy.
Figure 7:
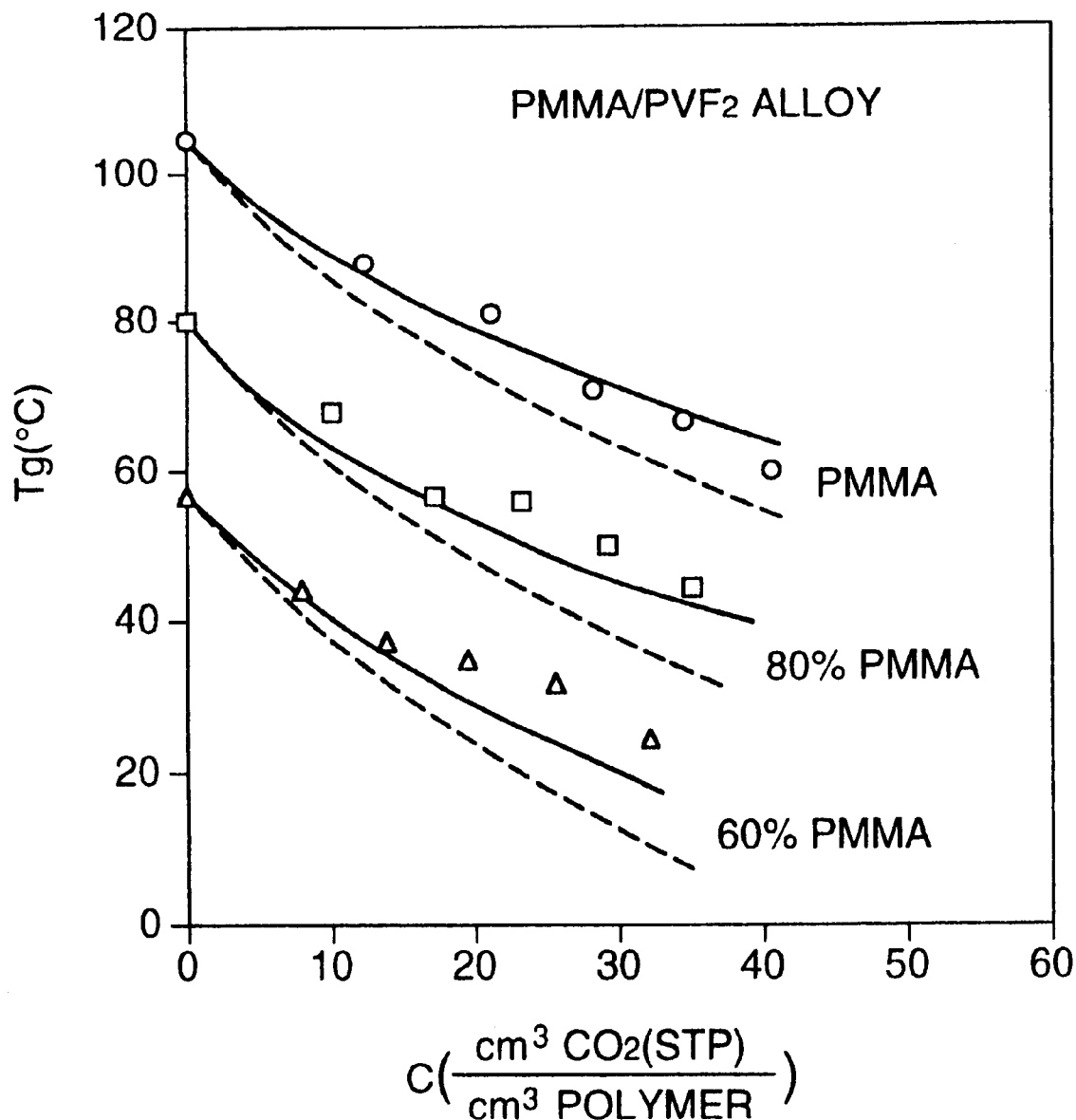
FIG. 7 is a graph which shows reduction of Tg due to dissolution of carbon dioxide in PMMA/$PVF_2$ polymer alloy.
Figure 8:
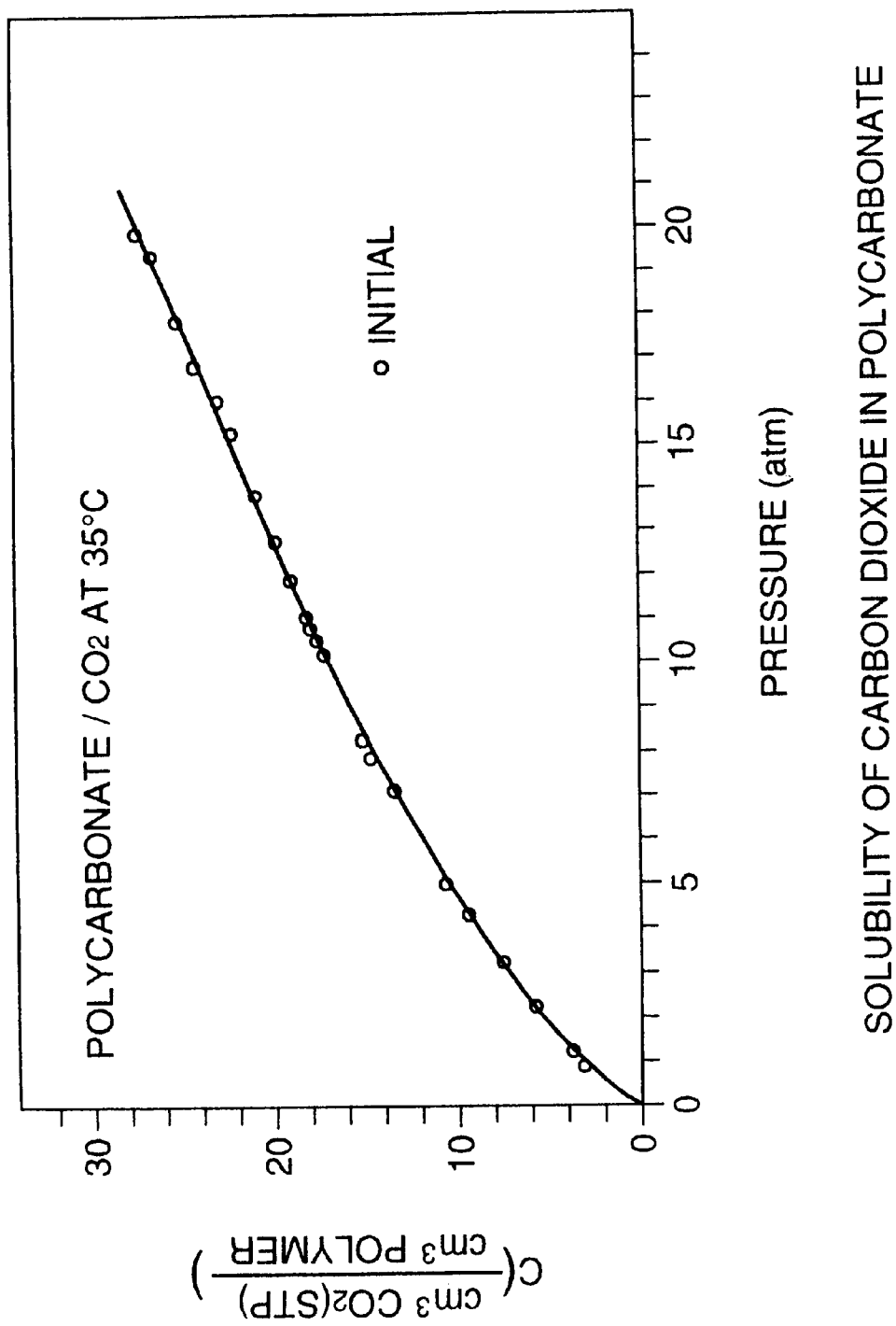
FIG. 8 is a graph which shows solubility of carbon dioxide in polycarbonate.
Figure 9:
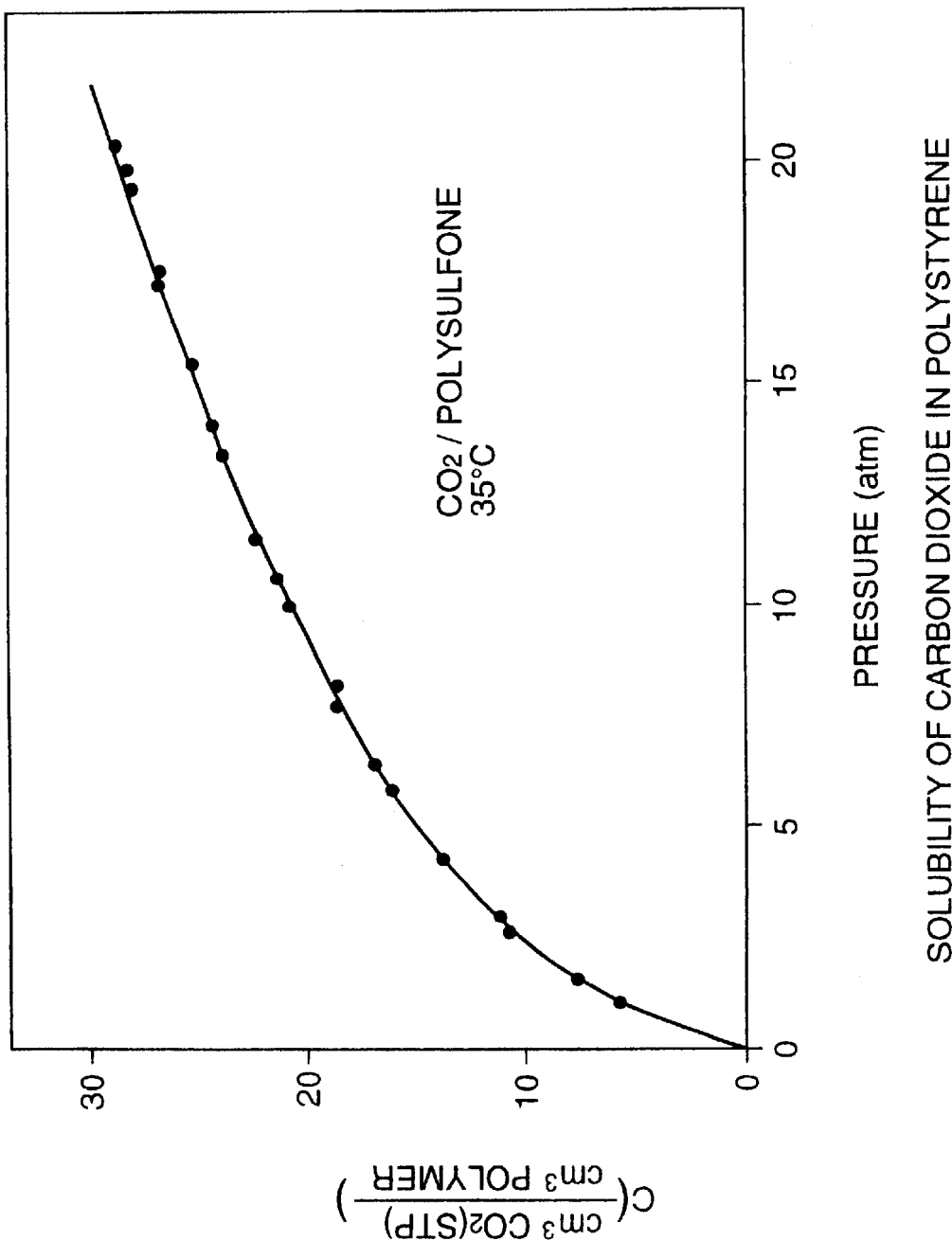
FIG. 9 is a graph which shows solubility of carbon dioxide in polysulfone.
Figure 10:
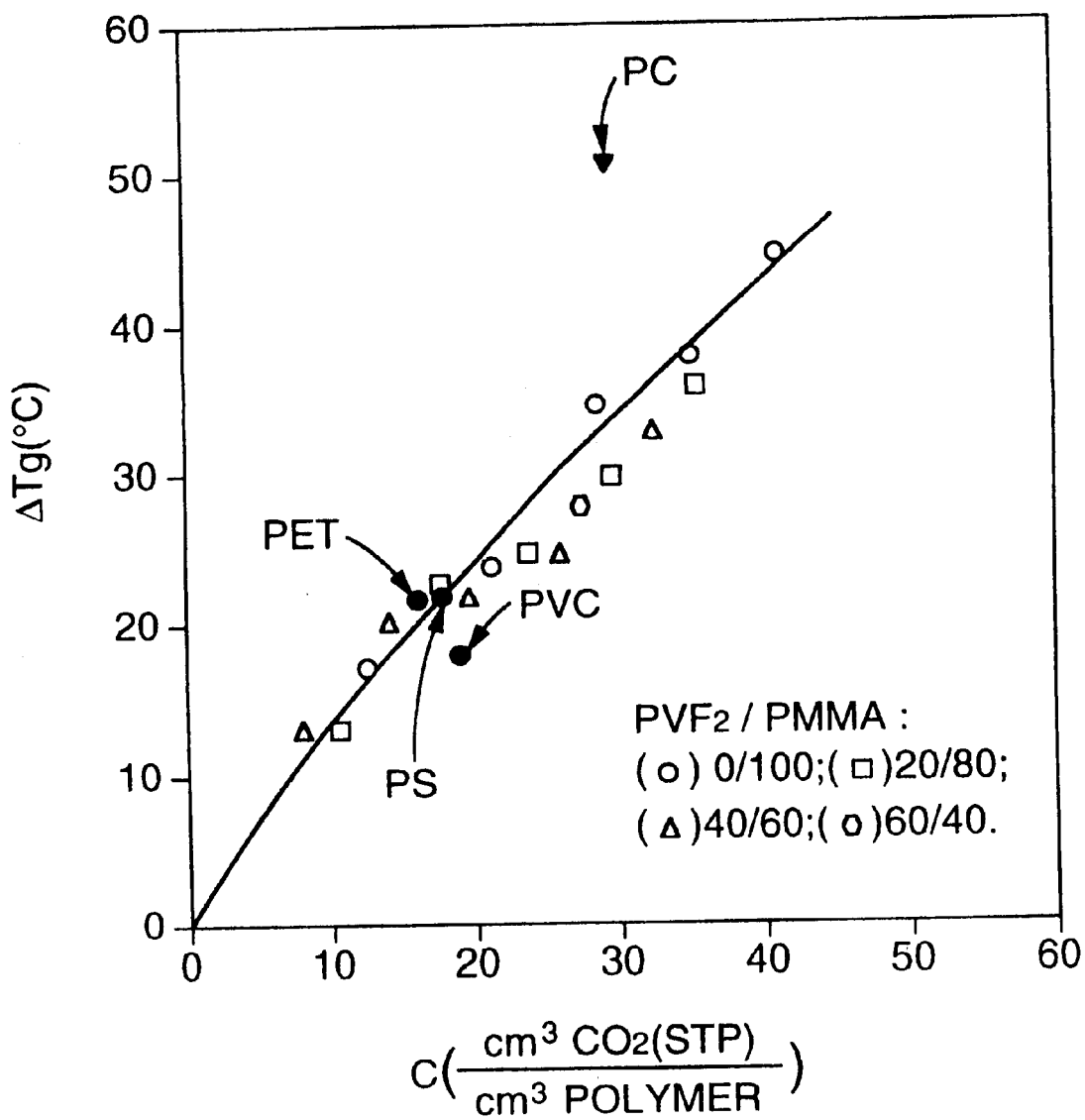
FIG. 10 is a graph which shows reduction of Tg due to dissolution of carbon dioxide in the respective synthetic resins.

FIGS. 1–10 illustrate the reports in various literatures. That is, FIG. 1 and FIG. 2 are cited from "Seikei Kakou, '96 (JSPP '96 Tech. Papers)", 279 (1996), FIGS. 3, 4, 5, 6 and 9 are cited from "J. Appl. Polym. Sci.", Vol. 30, 4019 (1985), FIG. 7 and FIG. 10 are cited from "J. Appl. Polym. Sci.", Vol. 30, 2633 (1985), and FIG. 8 is cited from "J. Membrane Sci.", Vol. 5, 63 (1979).

FIG. 1 and FIG. 2 show solubility of carbon dioxide and nitrogen in polystyrene, and carbon dioxide has a solubility of about ten times that of nitrogen.

Figure 3:
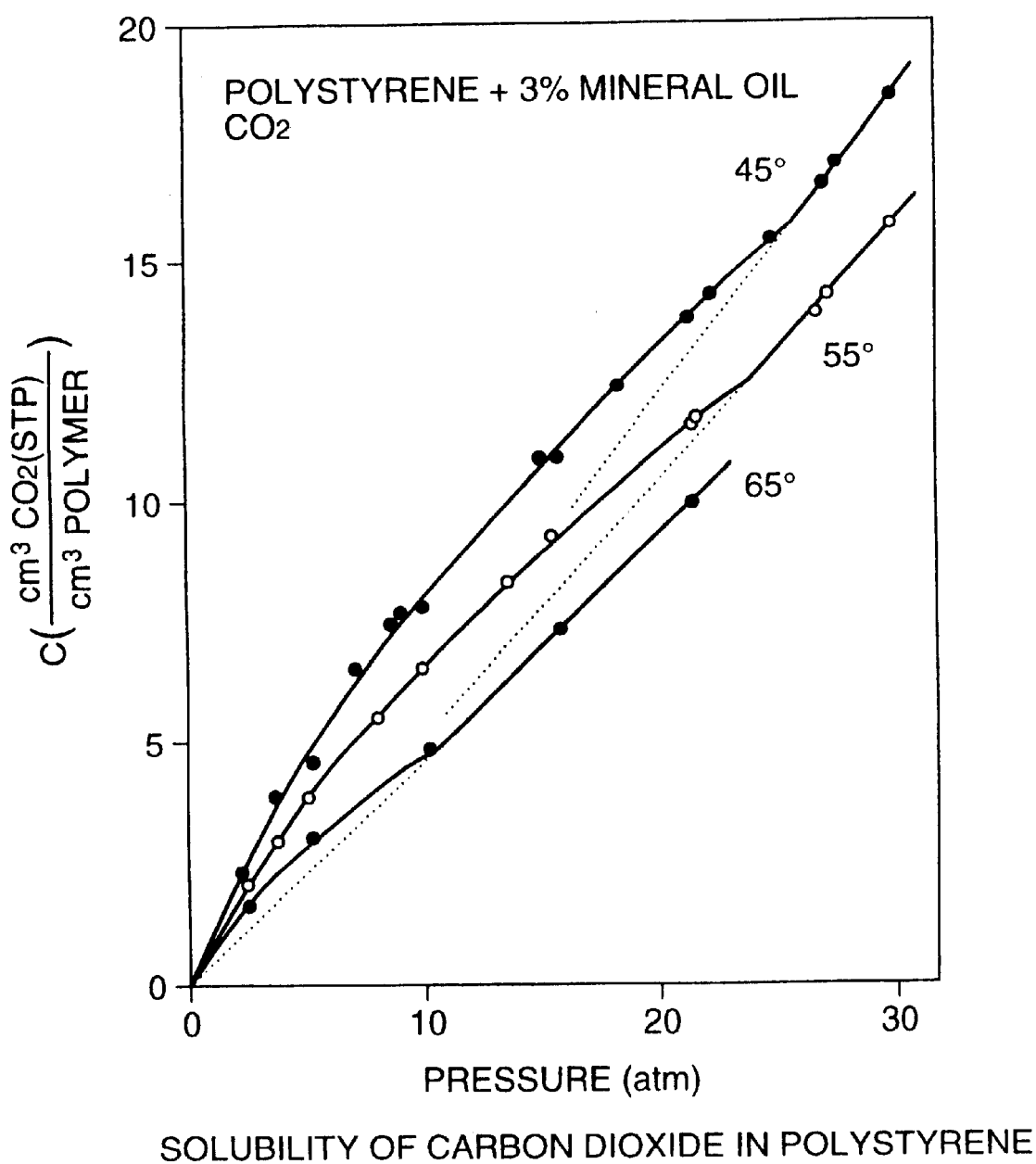
FIG. 3 is a graph which shows solubility of carbon dioxide in polystyrene.
Figure 4:
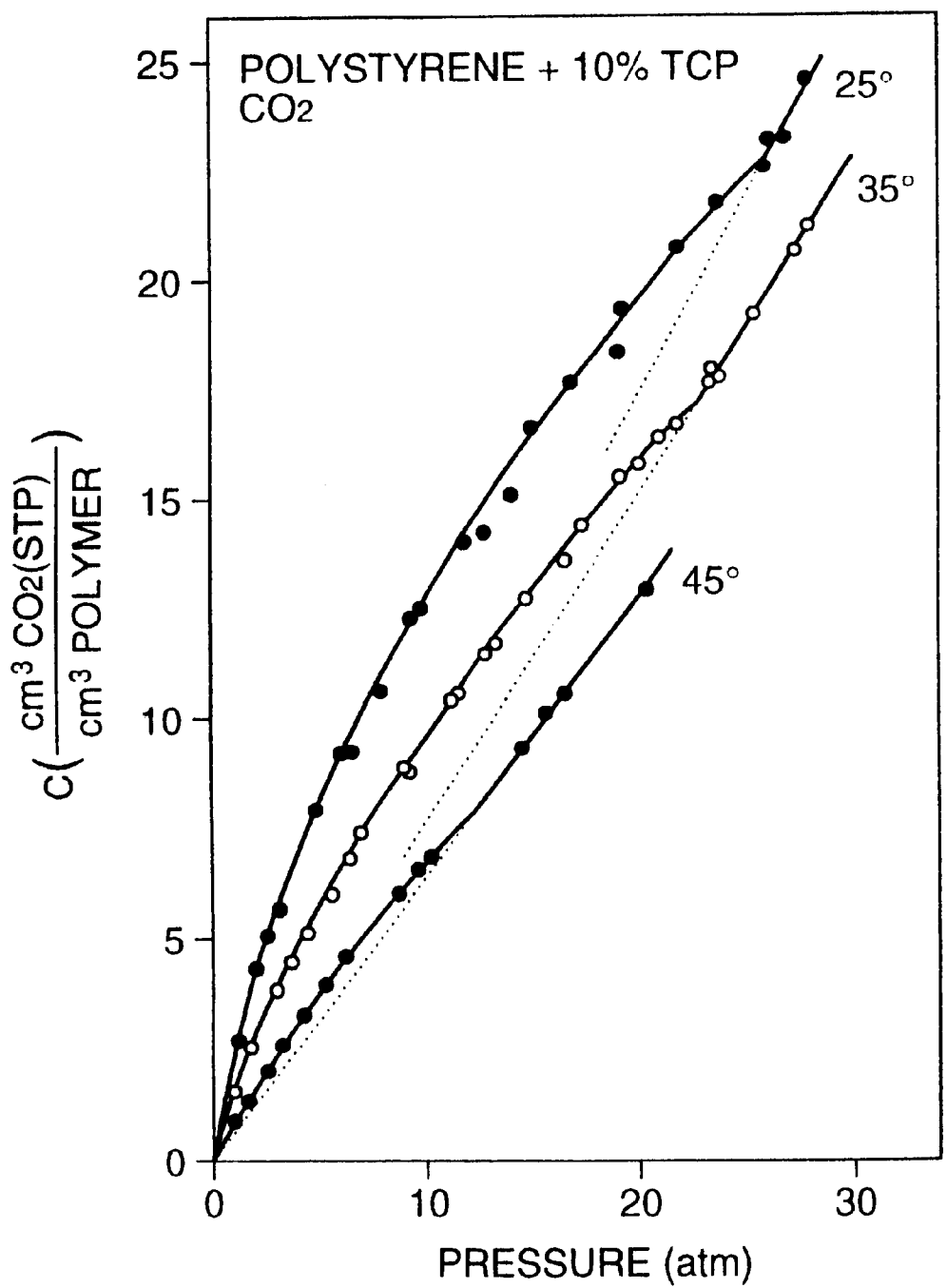
FIG. 4 is a graph which shows solubility of carbon dioxide in polystyrene.

FIG. 3 and FIG. 4 show solubility of carbon dioxide in polystyrene containing a liquid plasticizer, and FIG. 5 shows reduction of Tg caused by dissolution of carbon dioxide. Tg of polystyrene can be easily reduced by the dissolution of carbon dioxide therein.

FIG. 6 and FIG. 7 show solubility of carbon dioxide in polymethyl methacrylate and polyvinylidene fluoride polymer alloy and reduction of Tg caused by dissolution of carbon dioxide. Tg can be easily reduced by the dissolution of carbon dioxide.

FIG. 8 and FIG. 9 show solubility of carbon dioxide in polycarbonate and polysulfone.

FIG. 10 shows reduction of Tg of the respective resins caused by dissolution of carbon dioxide. Reduction of Tg caused by dissolution of carbon dioxide is nearly the same for the resins except the polycarbonate. In the case of the polycarbonate, the reduction of Tg caused by dissolution of carbon dioxide is especially great.

As for the pressure of the gas enclosed in the mold cavity, with increase of the pressure, a larger amount of the gas is dissolved in the resin and the solidification temperature becomes lower, and thus solidification during the filling of resin can be prevented even at a low mold temperature. Practically, the necessary gas pressure is determined depending on the desired degree of mold surface transferability, the kind of resin or gas, the mold temperature and other factors. When a gas of high solubility is used and the mold temperature is set higher, a sufficient transferability can also be obtained with a low gas pressure.

The lower limit of the pressure is determined by the effect of the gas dissolved in the resin as a plasticizer and is a pressure under which the gas is dissolved in an amount of 0.1% by weight in the resin at equilibrium condition at the solidification temperature of the resin and is preferably a pressure under which 0.5% by weight of the gas is dissolved. The solubility of the gas in the resin is a value measured by a pressure dropping method. Even under a pressure lower than the lower limit or even under atmospheric pressure, if a gas high in solubility such as carbon dioxide is used, there can be obtained an effect to improve transferability equal to or higher than the effect obtained when the pressure in the cavity is reduced by a vacuum pump. When a low pressure is used, it is preferred to replace the inner atmosphere in the cavity with a specific gas as far as possible.

The upper limit of the pressure is not especially critical, but if it is too high, the force to open the mold cannot be ignored or sealing of the mold becomes difficult. In view of these problems, it is practically 15 MPa or lower and preferably 10 MPa or lower. The gas pressure is preferably as low as possible within the range in which the desired effect can be obtained in order to minimize the amount of the gas used for one shot and simplify sealing of the mold and the structure of the gas supplying apparatus.

The air remaining in the mold at the time of mold closing is preferably replaced with a gas used during or after mold clamping. However, if the gas pressure employed exceeds 1 MPa, the influence of air can be mostly ignored.

After the mold cavity is filled with a resin, the gas forced out of the cavity is released to adjust to atmospheric pressure. The release of the gas is conducted after filling the mold cavity with molten resin. After the cavity is filled with resin, for the transfer of the state of the mold surface to a molded article, it is desired to apply a sufficient pressure to the resin in the cavity until the surface of the molded article is solidified. Especially when a dot-like dented configuration on the mold surface is transferred, it is necessary to press the resin to the mold against the gas pressure in the dents, and in such a case, it is desired to perform the molding under a resin pressure higher than in the usual molding procedure.

The gas dissolved in the resin is gradually released when the molded article is left to stand after molding of the resin. No bubbles are produced in the molded article due to the release of the gas and the mechanical performance of the molded article after the gas has been released does not differ from that made by the conventional methods.

Preferably, some measures to prevent liquefaction of the gas are to be taken for apparatuses of supplying the gas to the cavity and discharging the gas from the cavity, gas pipings and molds. This is not only because a high gas pressure cannot be obtained at temperatures at which liquefaction of the gas occurs, but also if the liquefied gas contacts with resin in the cavity, a large amount of the gas is dissolved into the resin and the surface of the molded article is foamed after release of gas to result in poor appearance of the article. As measures for the prevention of liquefaction, mention may be made of the following means. That is, the gas is heated by a heater and the temperature of the gas flow path and mold is kept at higher than the critical temperature of the gas; a pressure release valve which can keep the gas pressure in the cavity and piping in an optional range is provided in order to prevent a sharp increase of pressure caused by the gas forced out of the cavity at the time of filling of resin; and a gas reservoir for permitting the gas to flow backward from the cavity is provided. However, to raise the temperature of the gas in an excess for preventing liquefaction of the gas is not preferred because the amount of the gas in the cavity decreases due to expansion of the gas.

For making an air-tight structure of the mold in counter pressure molding or the like, there are usually employed methods of sealing parting faces and plates and, furthermore, movable pins such as ejector pins connecting to the cavity by O-rings or covering the whole ejector pin plate part to which the ejector pin is fixed to make it air-tight. When an O-ring is used for sealing of the ejector pin, the ejector pin must be inserted after the O-ring is put between the two plates. In this case, if the O-ring is damaged by the edge of the tip of the ejector pin or resistance against insertion of the pin is great, the O-ring is distorted and a sure sealing cannot be maintained in many cases. On the other hand, if a rubber packing having a U-shaped section in the radial direction (hereinafter referred to as "U-packing") is used for the sealing, the insertion resistance at the time of insertion of the ejector pin is small and the mold can be easily fabricated without damaging it by the edge of the tip of the pin or causing distortion, and thus a sealing of high reliability can be attained.

Figure 12B:
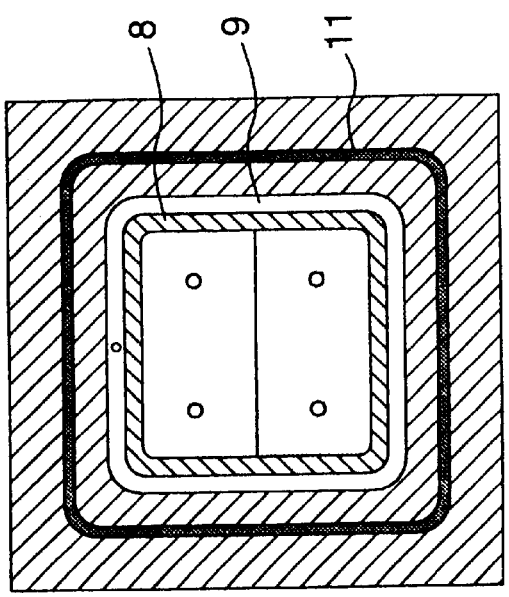
FIG. 12B is a plane view of the moving side of the mold.
Figure 12C:
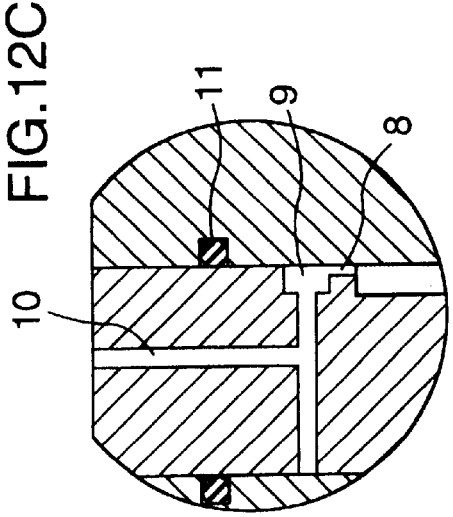
FIG. 12C is a detailed sectional view of the periphery of the mold cavity.
Figure 12D:
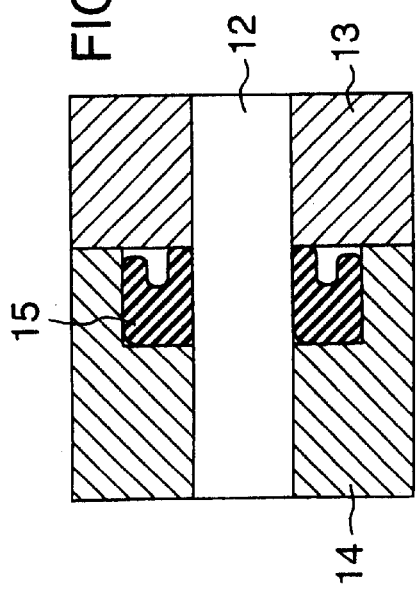
FIG. 12D is a detailed sectional view of the sealed portion of an ejector pin.
Figure 12A:
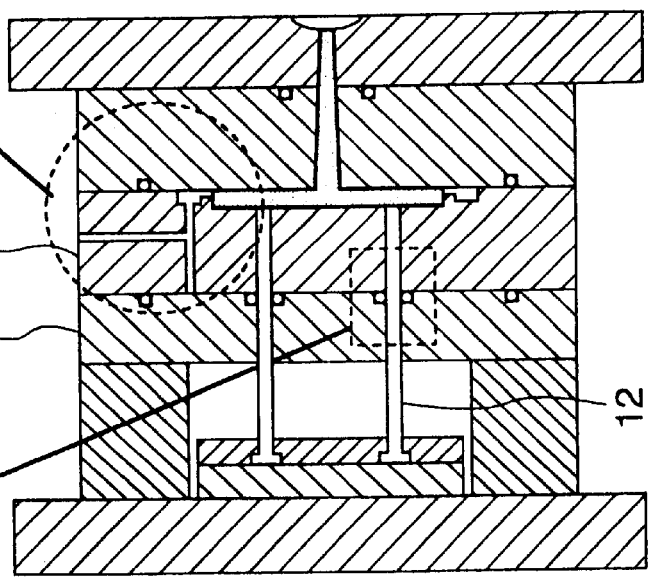
FIG. 12A is a sectional view of the whole mold for carrying out the present invention.

Furthermore, when a movable pin is sealed with a packing, the pressurized gas entering the space around the pin between the cavity and the packing is entrapped in the space by the filling of resin and when the molded article is cooled to leave the mold surface, the gas flows out into the cavity and sometimes dents the surface of the molded article which has not yet sufficiently solidified or expands or distorts the molded article at the time of mold opening. If these problems occur, it is preferred that channels or holes, which can discharge the gas entering the space around the pin out of the mold through the passages other than the cavity, are provided at the mold, and evacuation is performed simultaneously with discharging of the gas forced out of the cavity after the cavity is filled with resin. FIGS. 12A and 12C illustrate an example of the structure of a mold from which the pressurized gas can be discharged through passages other than the cavity.

Injection of a gas into the cavity is possible when a mold structure generally employed for venting of the cavity is used. For this purpose, there may be used a slit provided at the parting faces at the periphery of the cavity, a space around a cavity insert block or ejector pin, a venting pin, a liner made of porous sintered body and other means. When the atmosphere of the cavity is replaced with a gas of about atmospheric pressure, an economical method wherein the air in the cavity can be replaced in a short time with a gas in an amount as small as possible and as completely as possible, namely, with 100% of the gas, is required. A suitable method is to blow the gas into the cavity through a mold sprue. By injecting the gas from the mold sprue prior to filling the cavity with resin, the gas is pushed by the resin and as a result, the resin is molded while the air remaining in the cavity is discharged out of the mold by the gas. That is, when the atmosphere of sprue, runner and gate of the mold is sufficiently replaced with a gas, the gas which contacts with the resin is always the injected gas.

Figure 11:
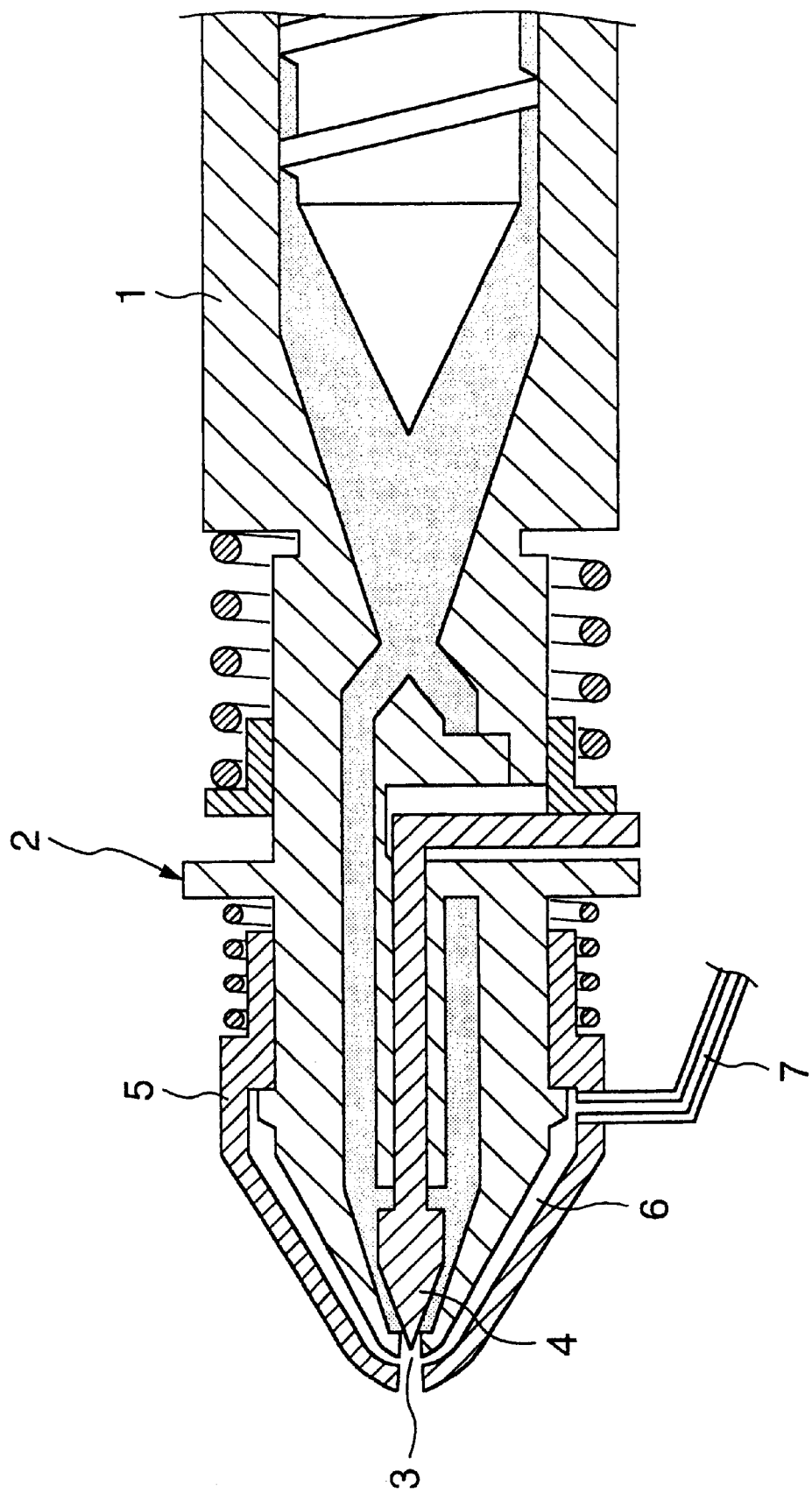
FIG. 11 is a sectional view of the portions of a nozzle of an injection molding machine for carrying out the present invention.

FIG. 11 shows a nozzle which injects a gas pressurizing the cavity from a sprue part of the mold. In FIG. 11, nozzle 2 connected to injection cylinder 1 has needle valve 4 which opens and closes nozzle tip 3. Outer nozzle 5 is provided at the nozzle tip portion, and space 6 formed by nozzle body 2 and outer nozzle 5 is connected to a gas source through passage 7. When the outer nozzle 5 lightly contacts with the mold, space 6 is connected to the cavity, and in this state, the gas is injected from space 6 into the mold. Then, when injection cylinder 1 moves forward to strongly press the outer nozzle 5 against the mold, a spring which presses the outer nozzle 5 against the mold is compressed and nozzle body 2 moves forward to cut off the communication between space 6 and the mold. In this state, the resin is filled in the mold from injection cylinder 1.

The present invention also includes a method which comprises filling a gas into a mold cavity under a low pressure of from atmospheric pressure to about 1 MPa and then compressing the gas in the cavity by filling the cavity with a molten resin to carry out the molding while increasing the gas pressure. When a mold of the structure where the gas in the cavity is sealed by an O-ring or the like is used and the cavity is filled with a gas under a low pressure of from atmospheric pressure to about 1 MPa and then filled with a resin, the gas is compressed by the resin and the gas pressure increases with the progress of filling of resin. When the gas pressure increases, the amount of the gas dissolved in the resin increases and the resin is plasticized with the dissolved gas to improve flowability and as a result, a high trasferability of mold surface can be attained. In the case of general injection molded articles, the transferability of mold surface at the end portion of resin flow where transmission of injection pressure is inferior is lower than at the portion of the gate, while according to the above method, the transferability of mold surface at the end portion of resin flow can be improved.

The method of the invention is also effective for transfer of fine dents present on the mold surface. In many cases, resin cannot enter sufficiently into the interior portion of fine dents owing to solidification of the resin during flowing or owing to the air trapped in the dents. However, according to the present invention, since the trapped gas is absorbed in the resin, it hardly hinders filling of resin, and due to the plasticizer effect of the absorbed gas, the solidification temperature of resin decreases and flowability increases. Thus, the resin can be filled into the innermost parts of the dents.

The present invention further provides another molding method according to which the effect of transferring the mold surface can be developed under the lower gas pressure in the cavity. That is, there is included a method which carries out the molding while reducing the solidification temperature of the resin surface during the filling step by allowing a liquid which dissolves in the resin and acts as a plasticizer to be present at the interface between the mold and the molten resin which contact with each other. The transferability of the mold surface to molded articles can be improved by adequately selecting a plasticizer and coating it on the mold surface at an adequate thickness.

The present invention further includes a method of molding which comprises injecting into a cooled mold cavity, carbon dioxide or the like with a vapor and/or mist of a liquid in which carbon dioxide or the like is readily dissolved. The liquid here is one which is high in dissolvability of carbon dioxide, has a boiling point higher than the mold temperature and is well dissolved in resins. Suitably usable are good solvents or plasticizers for resins which are high in dissolvability of carbon dioxide. In general, there may be used water, ketones such as acetone and methyl ethyl ketone, alcohols such as ethyl alcohol and various polar solvents. Carbon dioxide containing a vapor and/or mist of a liquid in which carbon dioxide is readily dissolved is injected into a cooled mold cavity to coat the cavity surface with a thin layer of a liquid containing a large amount of carbon dioxide having a plasticizing effect for resin due to dropwise condensation on the cooled cavity surface. The resin is pressed to this surface during molding to impregnate the resin surface layer with a large amount of carbon dioxide, and thus transferability of the mold surface to molded articles can be improved. That is, this method includes supplying a large amount of carbon dioxide to the resin surface while merely supplying carbon dioxide of low pressure to the cavity by allowing a liquid containing a large amount of carbon dioxide to be present on the mold surface. The thickness of the thin layer liquid on the mold surface must be in such a range that the resin surface does not slip off the mold surface at the time of filling of the resin. In general, the thickness is preferably in the range of about 0.1–10 $\mu$m. The concentration of the liquid in carbon dioxide is preferably such so as to provide the thin layer liquid of the above thickness.

In the present invention, various injection molding methods can be satisfactorily used. There may be satisfactorily used low-pressure injection molding methods generally considered to be inferior in mold surface transferability, such as gas assist injection molding, liquid assist injection molding and injection compression molding. Furthermore, there may also be satisfactorily used an injection molding which includes low-speed filling of resin at a moving speed of melt front of 200 mm/sec or lower, especially 100 mm/sec or lower in the cavity. This includes the cases where the flowing speed of resin is temporarily low, the flowing stops for a moment, the flowing speed is low all the while, and others. According to the present invention, since the solidification of resin at the time of filling of the resin can be prevented, there hardly occur partial differences in mold surface transferability called hesitation marks often seen in gas assist injection molding which are caused by differences in resin flowing speed.

Moreover, the method of the present invention can be used in combination with the conventional method for improving the mold surface transferability by which the mold surface temperature is raised. In these conventional molding methods, since the mold temperature is high, the resin and the mold are apt to adhere to each other at the filling of the resin, and when the air in the cavity is trapped between the resin and the mold, it often forms dents on the resin surface. By combining these methods with the present invention, not only can the formation of dents on the resin surface be avoided, but also a high mold surface transferability can be obtained with the lower mold temperature and the heating efficiency can be enhanced.

Furthermore, the method of the present invention can be used in combination with the method of vibrating the resin during the step of filling of the resin, thereby producing molded articles having high transferability of mold surface as well as high mechanical properties. For vibrating the resin, the following methods are mentioned: a method of vibrating the resin in an injection cylinder (Polm. Plast. Technol, Eng., 17(1), 11 (1981), etc.); a method of vibrating the mold ("Seikei Kakou '97 (JSPP '97 Tech. Papers)", 185 (1997), etc.); and a method of vibrating a pressurized gas in the cavity (Plastics World, Jul. 8 (1997), etc.). Particularly, when the method of the present invention is used in combination with the method of vibrating the pressurized gas in the cavity, the hindrance of transfer due to the nitrogen which is conventionally employed can be prevented resulting in a highly synergistic effect.

According to the present invention, it becomes possible to economically and highly faithfully transfer the state of the mold surface to molded articles. Therefore, subsequent steps such as coating which have been reluctantly carried out in the case of appearance of the molded articles being poor are not needed and the cost for parts can be sharply reduced. In addition productivity of plane lenses can be markedly increased, which have been produced by press molding in lower productivity than injection molding because the former cannot uniformly transfer a fine configuration of the mold surface to molded articles. Thus, new uses of injection molding can be expected.

As molded articles which can be made satisfactorily by the present molding method, mention may be made of resin injection molded articles such as parts of optical instruments, housings of light electrical equipments and electronic equipment, business and office machines, various automobile parts, various daily necessaries and the like. The present method is suitable for the improvement of the appearance of housings for electronic equipment, electric equipment and business and office machines which are injection molded by multi-point gates to result in many weld lines and, furthermore, the appearance of matted molded articles and pattern graining molded articles. Moreover, the present method is suitable for making injection molded articles of various optical parts, for example, lenses made by molding transparent synthetic resins, such as lenticular lens and Fresnel lens, recording disks such as optical disks, and liquid crystal display parts such as light guiding plates and diffuser panels. The present method has the effects in that molded articles made by the present method are improved in transferability of mold surface and in gloss, diminished in poor appearance caused by weld lines, and improved in reproducibility of sharp edges of the mold surface and fine irregularities on the mold surface. Further effects are the diminishing of internal strains generated near the surface of molded articles at the time of filling of resins, decrease of birefringence, improvement of chemical resistance, and improvement of plating performance due to reduction of orientation of the added rubber. Furthermore, since generation of gas from the melt front at the step of filling of resin is inhibited by enclosing a gas of high pressure in the cavity, the effects such as reduction of stain of the mold and decrease of power necessary for removing the molded articles can be expected.

The effects of the present invention will be further specifically explained by the following examples and comparative examples.

The resins used for injection molding were a rubber-reinforced polystyrene (STYRON 400 manufactured by Asahi Kasei Kogyo K.K.), an ABS resin filled with 20% of glass fibers (STYRAC ABS R240A manufactured by Asahi Kasei Kogyo K.K.), a methacrylic resin (DELPET 80NH manufactured by Asahi Kasei Kogyo K.K.) and a polycarbonate (PANLITE L1225 manufactured by Teijin Kasei Co., Ltd.).

Carbon dioxide of 99% or higher in purity was used as a gas.

The molding machine used was SG50 manufactured by Sumitomo Heavy Industries Ltd.

Figure 13:
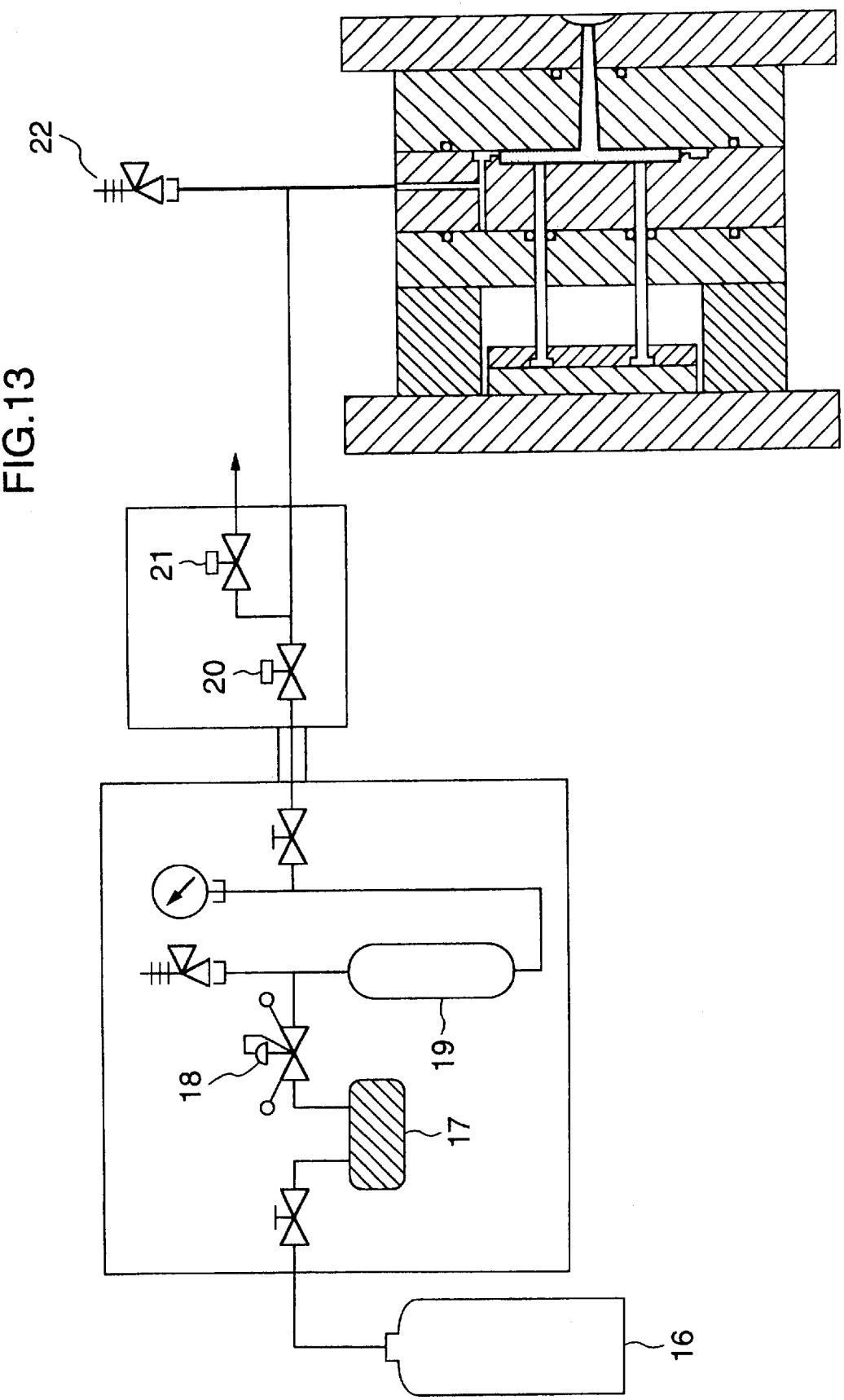
FIG. 13 is a diagram indicating the constitution of a gas supplying apparatus used in carrying out the present invention.

The molded article is a square flat plate of 100 mm×100 mm with 2 mm in thickness. The structure of the mold is shown in FIGS. 12A–12D and that of the gas supplying apparatus is shown in FIG. 13. Regarding the mold surface, the half of the cavity surface on the moving side was subjected to satinizing treatment and the other half was a specular surface. A direct gate of 8 mm in diameter was provided at the center of the molded article, and the length of the sprue was 58 mm and the diameter of the nozzle touching portion was 3.5 mm. Slit 8 of 0.05 mm in depth, gas flow channel 9, and hole 10 which communicates with the outside of the mold through the gas flow channel 9 were provided at the periphery of the mold cavity for supplying and discharging the gas. The mold was connected to the gas supplying apparatus through the hole 10, and an O-ring 11 was provided around the vent slit and hole for gas sealing to make the cavity air-tight. Furthermore, ejector pin 12 was sealed by inserting U-packing 15 between cavity block 13 and backup plate 14. The U-packing used was MPR series manufactured by Nippon Valqua Industries, Ltd. The hole 10 communicating with the outside of the mold also communicates with the space around the ejector pin 12 and the space between the cavity block 13 and the backup plate 14, and thus the gas in the space can be discharged simultaneously with completion of filling of the resin.

In the gas supplying apparatus, bomb 16 filled with liquefied carbon dioxide gas and kept at 40° C. was used as a source for supplying a gas of about 12 MPa. The gas is supplied from bomb 16 through heater 17 and adjusted to a given pressure by reducing valve 18, and then is reservoired in gas reservoir 19 of 100 cm$^3$ in internal volume which is kept at about 40° C. Supply of the gas to the mold cavity is performed by opening supply solenoid valve 20 provided downstream from the gas reservoir 19 and simultaneously closing release solenoid valve 21. The gas reservoir and the cavity communicate with each other during the filling of resin. Simultaneously with completion of filling of the resin, the supply solenoid valve 20 is closed and release solenoid valve 21 is opened, whereby the gas is released out of the mold. In the case of compressing the gas in the cavity by filling a molten resin to increase the pressure, after supply of the gas, supply solenoid valve 20 is closed simultaneously with starting of filling of the resin and release solenoid valve 21 is opened at completion of filling of the resin. Unnecessary increase of pressure during the filling of resin is prevented by discharging the gas from pressure release valve 22.

Transferability of the state of the mold surface was evaluated by measuring the surface gloss of the specular surface part, observing by a light microscope, and measuring surface roughness of the satinized part. A varied-angle glossmeter UGV-5K manufactured by Suga Shikenki Co., Ltd. was used for the measurement of the surface gloss and SURFCOM 575A manufactured by Tokyo Seimitsu Co., Ltd. was used for the measurement of the surface roughness.

EXAMPLE 1

The mold of 70° C. in cavity surface temperature was filled with carbon dioxide under a pressure of 5.0 MPa, and the rubber-reinforced polystyrene having a resin temperature of 220° C. was filled with a filling time of 0.6 second or 2.4 seconds. A resin pressure of 35 MPa in the cylinder was held for 10 seconds, and the resin was cooled for 20 seconds. The molded article was then removed. Carbon dioxide filled in the mold was released to the atmosphere simultaneously with completion of filling of the resin.

The surface gloss of the resulting molded articles was measured to find that they were excellent in surface gloss irrespective of the filling time (60° specular gloss=101 for both the samples).

EXAMPLE 2

Molded articles were obtained in the same manner as in Example 1, except that the pressure of carbon dioxide filled in the mold was 2.5 MPa.

The surface gloss of the resulting molded articles was measured to find that they were excellent in surface gloss irrespective of the filling time (60° specular gloss=88 for both the samples).

EXAMPLE 3

Molded articles were obtained in the same manner as in Example 2, except that the mold cavity surface temperature was 80° C.

The surface gloss of the resulting molded articles was measured to find that they were excellent in surface gloss irrespective of the filling time (60° specular gloss=108 for both the samples).

EXAMPLE 4

Molded articles were obtained in the same manner as in Example 1, except that the ABS resin filled with 20% of glass fibers was used, the mold cavity surface temperature was 88° C., the resin temperature was 240° C. and the holding pressure was 70 MPa.

The surface gloss of the resulting molded articles was measured to find that they were excellent in surface gloss irrespective of the filling time (60° specular gloss=99 for both the samples).

Furthermore, the surface of the molded articles was observed by a microscope at 100×magnification to find that substantially no glass fibers were exposed on the surface and the surface of the both articles was smooth.

EXAMPLE 5

The mold of 80° C. in cavity surface temperature was filled with carbon dioxide at a pressure of 5.0 MPa, and the methacrylic resin having a resin temperature of 240° C. was filled with a filling time of 0.6 second. A resin pressure of 80 MPa in the cylinder was held for 10 seconds, and the resin was cooled for 20 seconds. The molded article was then removed. Carbon dioxide filled in the mold was released to the atmosphere simultaneously with completion of filling of the resin.

The resulting molded article had a surface roughness Rmax of 12.0 μm in the satinized part.

EXAMPLE 6

The mold of 120° C. in cavity surface temperature was filled with carbon dioxide at a pressure of 5.0 MPa, and the polycarbonate having a resin temperature of 300° C. was filled with a filling time of 0.6 second. A resin pressure of 120 MPa in the cylinder was held for 10 seconds, and the resin was cooled for 20 seconds. The molded article was then removed. Carbon dioxide filled in the mold was released to the atmosphere simultaneously with completion of the filling of the resin.

The resulting molded article had a surface roughness Rmax of 11.5 μm in the satinized part.

Comparative Example 1

Molded articles were obtained in the same manner as in Example 1, except that the mold was opened to the atmosphere without connecting the gas supply apparatus thereto.

The surface gloss of the resulting molded articles was measured. It was found that the 60° specular gloss was 61 in the case of the filling time being 0.6 second and 48 in the case of the filling time being 2.4 seconds, and, thus, the surface gloss of these molded articles was inferior and depended on the filling time.

Comparative Example 2

Molded articles were obtained in the same manner as in Example 1, except that nitrogen was used as the gas filled in the mold.

The surface gloss of the resulting molded articles was measured. As a result, it was found that these molded articles were inferior to those of Comparative Example 1 in surface gloss (60 specular gloss=46 in the case of the filling time being 0.6 second and 60° specular gloss=40 in the case of the filling time being 2.4 seconds).

Comparative Example 3

Molded articles were obtained in the same manner as in Example 4, except that the mold was opened to the atmosphere without connecting the gas supply apparatus thereto.

The surface gloss of the resulting molded articles was measured. It was found that the 60° specular gloss was 85 in the case of the filling time being 0.6 second and 62 in the case of the filling time being 2.4 seconds, and thus, the surface gloss of these molded articles was inferior and depended on the filling time.

Furthermore, the surface of the molded articles was observed by a microscope to find many glass fibers and irregularities on the surface.

Comparative Example 4

A molded article was obtained in the same manner as in Example 5, except that the mold was opened to the atmosphere without connecting the gas supply apparatus thereto.

The surface roughness Rmax of the satinized part of the resulting molded article was 8.2 μm.

Comparative Example 5

A molded article was obtained in the same manner as in Example 6, except that the mold was opened to the atmosphere without connecting the gas supply apparatus thereto.

The surface roughness Rmax of the satinized part of the resulting molded article was 7.4 μm.

The results of the Examples and Comparative Examples are shown in Tables 1 and 2.

TABLE 1

60° specular gloss in Examples and Comparative Examples

|  | Resin | Mold temperature/° C. | Kind of gas | Gas pressure/ MPa | Resin filling time (Unit: %) | |
| --- | --- | --- | --- | --- | --- | --- |
|  |  |  |  |  | 0.6 sec. | 2.4 sec. |
| Example 1 | HIPS | 70 | Carbon dioxide | 5.0 | 101 | 101 |
| Example 2 | HIPS | 70 | Carbon dioxide | 2.5 | 88 | 88 |
| Example 3 | HIPS | 80 | Carbon dioxide | 2.5 | 108 | 108 |
| Example 4 | ABS-GF | 88 | Carbon dioxide | 5.0 | 99 | 100 |
| Comparative Example 1 | HIPS | 70 | Air | 0.1 | 61 | 48 |
| Comparative Example 2 | HIPS | 70 | Nitrogen | 5.0 | 46 | 40 |

TABLE 1-continued

60° specular gloss in Examples and Comparative Examples

|  | Resin | Mold temperature/° C. | Kind of gas | Gas pressure/ MPa | (Unit: %) Resin filling time | |
|---|---|---|---|---|---|---|
|  |  |  |  |  | 0.6 sec. | 2.4 sec. |
| Comparative Example 3 | ABS-GF | 88 | Air | 0.1 | 85 | 62 |

TABLE 2

Surface roughness Rmax of satinized part in Examples and Comparative Examples
Surface roughness of mold Rmax: 13.2 μm

|  | Resin | Mold temperature/° C. | Kind of gas | Gas pressure/ MPa | Transferability Rmax/μm | Surface roughness/% |
|---|---|---|---|---|---|---|
| Example 5 | PMMA | 80 | Carbon dioxide | 5.0 | 12.0 | 91 |
| Example 6 | PC | 120 | Carbon dioxide | 5.0 | 11.5 | 87 |
| Comparative Example 4 | PMMA | 80 | Air | 0.1 | 8.2 | 62 |
| Comparative Example 5 | PC | 120 | Air | 0.1 | 7.4 | 56 |

What is claimed is:

1. In a method for making an optical disk of polycarbonate by injection molding comprising the steps of:

filling a mold cavity having a formed surface with a gas;

filling said polycarbonate in a molten state into said mold cavity;

cooling and solidifying said polycarbonate thereby forming an optical disk of said polycarbonate; and taking the optical disk of said polycarbonate out of the mold, the improvement comprising the steps of using carbon dioxide as said gas, thereby dissolving carbon dioxide that is at the surface of the polycarbonate in the mold cavity and reducing the solidification temperature of the polycarbonate surface which contacts with the mold; and pressing said polycarbonate to the surface of the mold for transferring the form of the surface of the mold to the surface of said polycarbonate, before the step of cooling and solidifying said polycarbonate.

2. A method according to claim 1, wherein said gas with which the mold cavity is filled is at a pressure at which at least 0.1% by weight of the gas is dissolved in the polycarbonate at the glass transition temperature of the polycarbonate.

3. A method according to claim 1, wherein said gas with which the mold cavity is filled is at a pressure at which at least 0.5% by weight of the gas is dissolved in the polycarbonate at the glass transition temperature of the polycarbonate.

4. In a method for making an optical disk of polymethyl methacrylate by injection molding comprising the steps of:

filling a mold cavity having a formed surface with a gas;

filling said polymethyl methacrylate in a molten state into said mold cavity;

cooling and solidifying said polymethyl methacrylate thereby forming an optical disk of said polymethyl methacrylate; and taking the optical disk of said polymethyl methacrylate out of the mold, the improvement comprising the steps of using carbon dioxide as said gas, thereby dissolving carbon dioxide that is at the surface of the polymethyl methacrylate in the mold cavity and reducing the solidification temperature of the polymethyl methacrylate surface which contacts with the mold; and pressing said polymethyl methacrylate to the surface of the mold for transferring the form of the surface of the mold to the surface of said polymethyl methacrylate, before the step of cooling and solidifying said polymethyl methacrylate.

5. A method according to claim 4, wherein said gas with which the mold cavity is filled is at a pressure at which at least 0.1% by weight of the gas is dissolved in the polymethyl methacrylate at the glass transition temperature of the polymethyl methacrylate.

6. A method according to claim 4, wherein said gas with which the mold cavity is filled is at a pressure at which at least 0.5% by weight of the gas is dissolved in the polymethyl methacrylate at the glass transition temperature of the polymethyl methacrylate.

* * * * *